(12) United States Patent
Perkowski

(10) Patent No.: US 12,102,056 B1
(45) Date of Patent: Oct. 1, 2024

(54) PET WASTE BAG SYSTEMS AND METHODS

(71) Applicant: Thomas Perkowski, Friday Harbor, WA (US)

(72) Inventor: Thomas Perkowski, Friday Harbor, WA (US)

(*) Notice: Subject to any disclaimer, the term of this patent is extended or adjusted under 35 U.S.C. 154(b) by 219 days.

(21) Appl. No.: 17/664,818

(22) Filed: May 24, 2022

Related U.S. Application Data

(60) Provisional application No. 63/192,714, filed on May 25, 2021.

(51) Int. Cl.
*A01K 1/01* (2006.01)
*B65D 33/00* (2006.01)

(52) U.S. Cl.
CPC .......... *A01K 1/0125* (2013.01); *B65D 33/002* (2013.01)

(58) Field of Classification Search
CPC .......................... A01K 1/0125; B65D 33/002
USPC ..................... 383/105, 2, 4; 294/1.3
See application file for complete search history.

(56) References Cited

U.S. PATENT DOCUMENTS

| | | | | |
|---|---|---|---|---|
| 4,430,087 A | * | 2/1984 | Azpiri | A61F 13/551 604/385.13 |
| 2002/0065500 A1 | * | 5/2002 | Rossi | A61F 13/551 604/385.06 |
| 2005/0182379 A1 | * | 8/2005 | Olsen | A61F 13/551 604/385.13 |
| 2012/0226256 A1 | * | 9/2012 | Ung | A61F 13/5512 604/385.13 |

FOREIGN PATENT DOCUMENTS

JP            11056903 A  *   3/1999
WO    WO-2008023363 A2  *   2/2008   ...... A61F 13/5519

* cited by examiner

*Primary Examiner* — Jes F Pascua
(74) *Attorney, Agent, or Firm* — Schacht Law Office, Inc.; Michael R. Schacht

(57) ABSTRACT

A waste bag system comprising a substrate, a waste bag, and a cover sheet. The substrate defines an adhesive surface. The waste bag configured to be arranged in a folded configuration and an unfolded configuration. At least a portion of the adhesive surface is in contact with at least a portion of the waste bag to at least temporarily attach the waste bag to the substrate. At least a portion of the adhesive surface is in contact with at least a portion of the cover sheet to detachably attach the cover sheet to the substrate to maintain the waste bag in the folded configuration. With the cover sheet at least partly detached from substrate, the waste bag may be reconfigured from the folded configuration to the unfolded configuration.

14 Claims, 11 Drawing Sheets

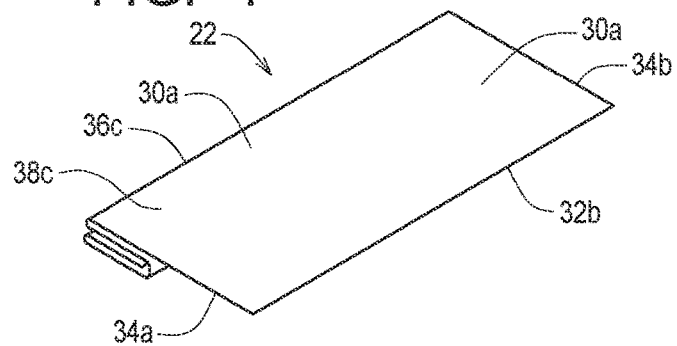
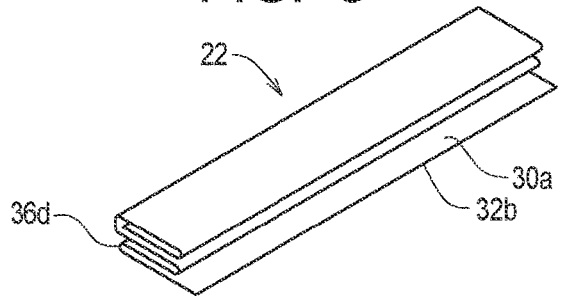
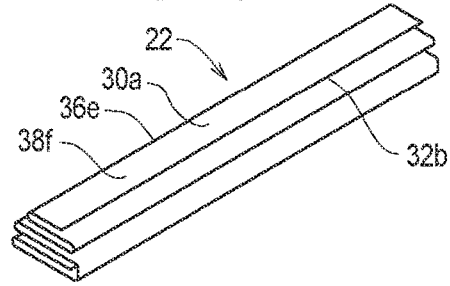
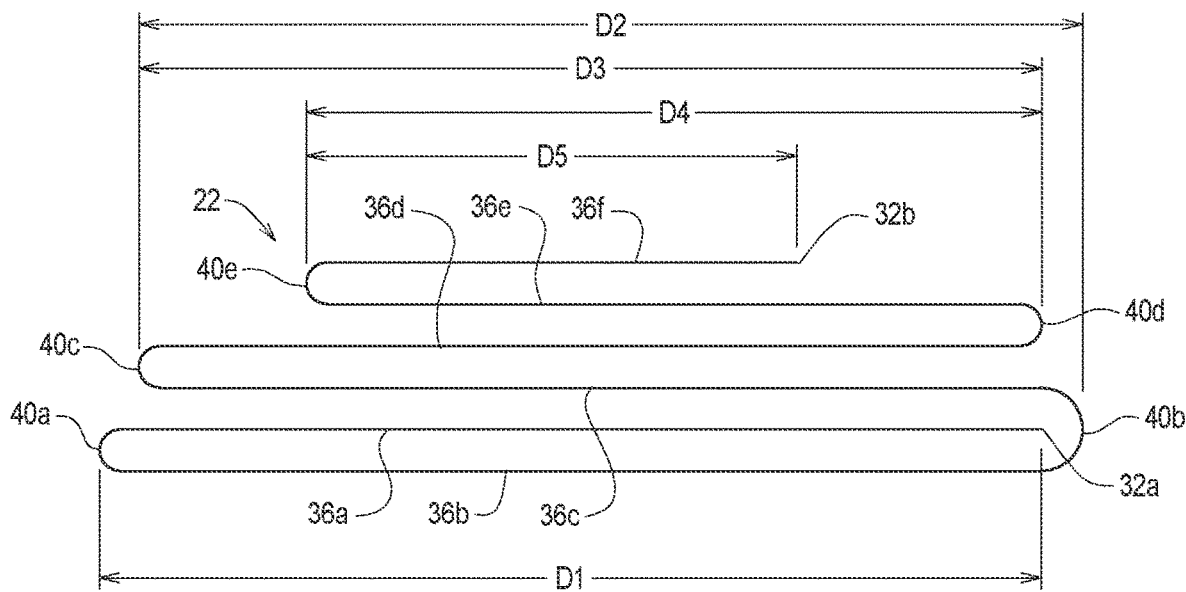

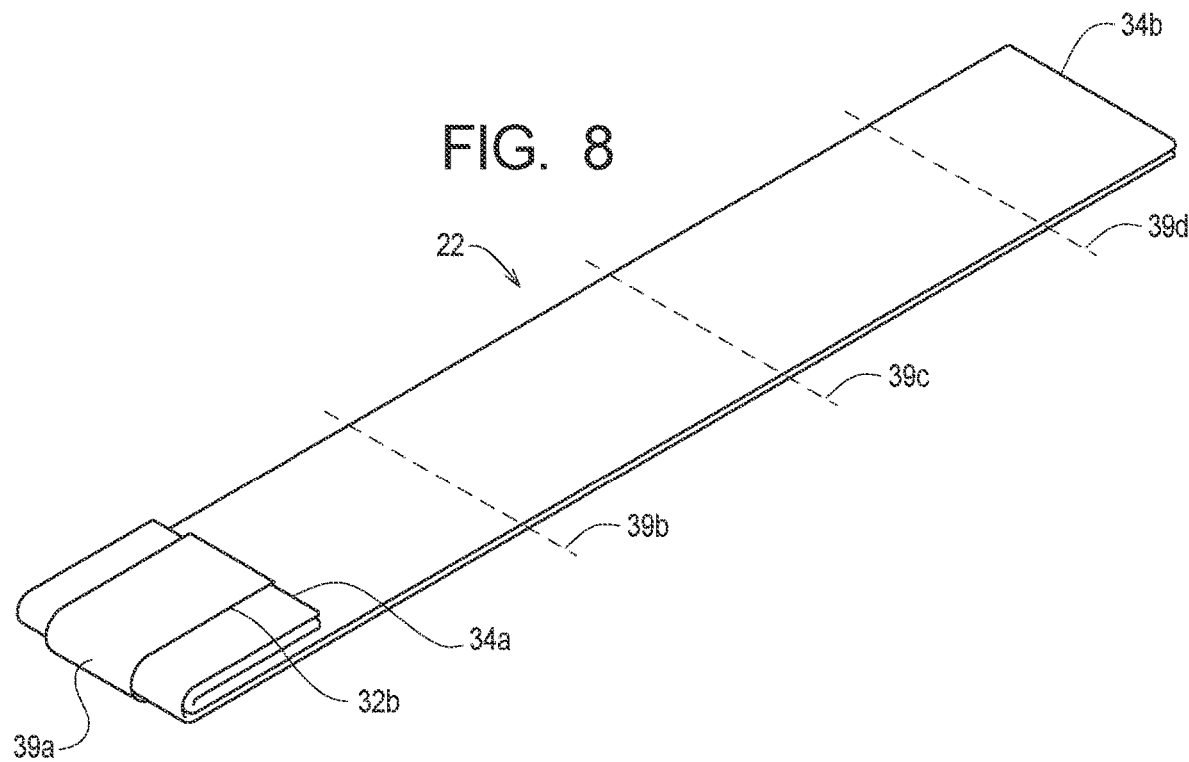
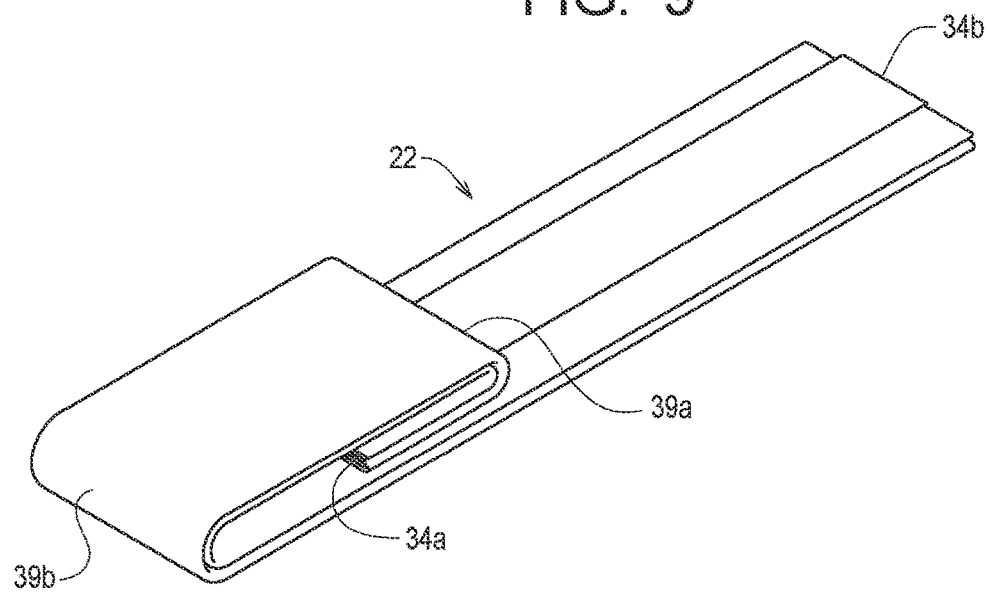

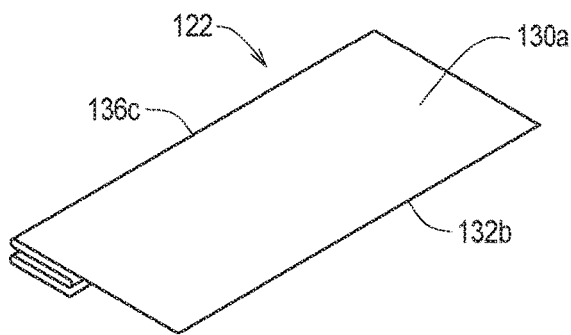
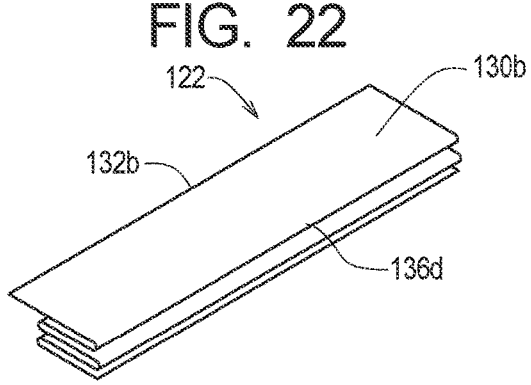
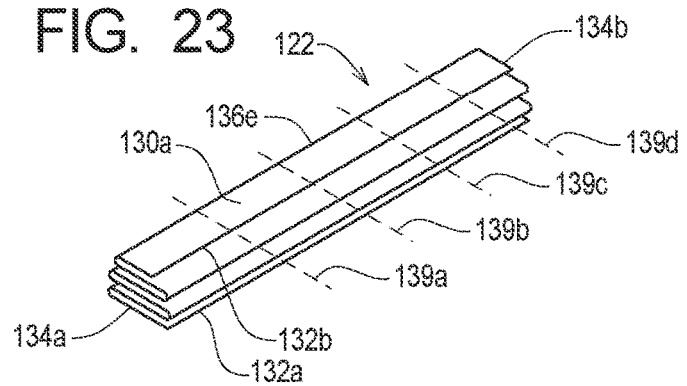
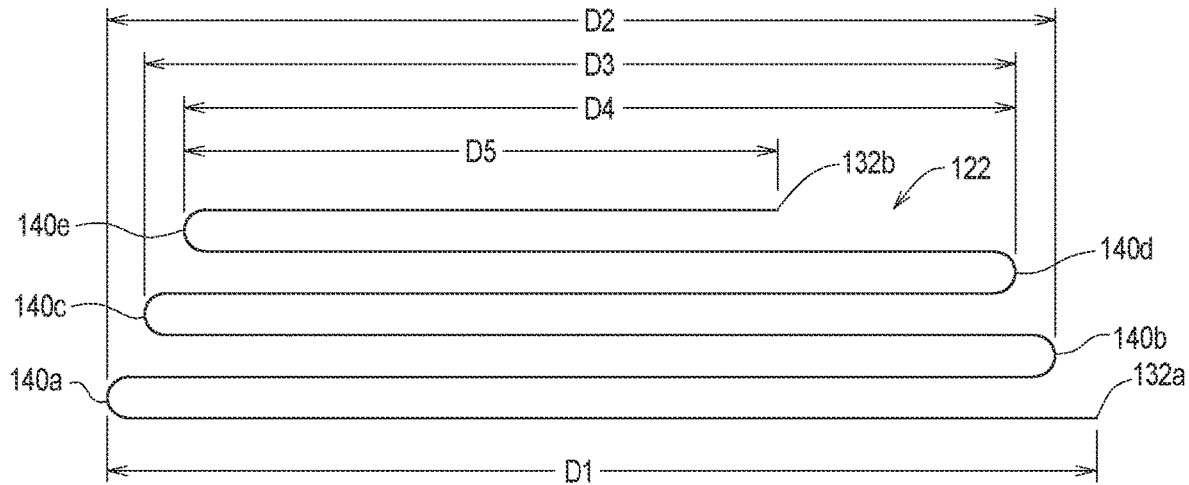

PET WASTE BAG SYSTEMS AND METHODS

RELATED APPLICATIONS

This application, U.S. patent application Ser. No. 17/664,818 filed May 24, 2022, claims benefit of U.S. Provisional Application Ser. No. 63/192,714 filed May 25, 2021, the contents of which are incorporated herein by reference.

TECHNICAL FIELD

The present invention relates to plastic bags and, more specifically, to pet waste bag systems and methods adapted to facilitate storage, transportation, and use of pet waste bags.

BACKGROUND

Many public areas require pet owners to collect their pet waste in waste bags and dispose of the pet waste. While some places provide disposal bags for pet waste, many places do not. This places the burden on pet owners to always provide their own disposable anytime they are out in public with their pets. Responsible pet owners typically carry around plastic bags that are not easy to fold and store in book bags, purses, wallets, and the like.

The need exists for a compact means of storing pet waste bags for convenient storage, transportation, and availability.

SUMMARY

The present invention may be embodied as a waste bag system comprising a substrate defining an adhesive surface, a waste bag configured to be arranged in a folded configuration and an unfolded configuration, and a cover sheet. At least a portion of the adhesive surface is in contact with at least a portion of the waste bag to at least temporarily attach the waste bag to the substrate. At least a portion of the adhesive surface is in contact with at least a portion of the cover sheet to detachably attach the cover sheet to the substrate to maintain the waste bag in the folded configuration. With the cover sheet at least partly detached from substrate, the waste bag may be reconfigured from the folded configuration to the unfolded configuration.

The present invention may also be embodied as a method of storing and transporting a waste bag comprising the following steps. A substrate defining an adhesive surface, a waste bag, and a cover sheet are provided. The waste bag is arranged in a folded configuration. The waste bag is arranged such at least a portion of the waste bag comes into contact with at least a first portion of the adhesive surface of the substrate to detachably attach the waste bag to the substrate. The cover sheet is arranged such at least a portion of the cover sheet comes into contact with at least a second portion of the adhesive surface of the substrate to detachably attach the cover sheet to the substrate such that the cover sheet may be at least partly detached from substrate to expose the waste bag for use.

The present invention may also be embodied as a waste bag system comprising a substrate, an adhesive layer defining an adhesive surface of the substrate, a waste bag, and a cover sheet. The waste bag is configured to be arranged in a folded configuration defining a folded bag form factor and an unfolded configuration defining an unfolded bag form factor. The unfolded bag form factor is larger than the folded bag form factor. At least a first portion of the adhesive layer is in contact with at least a portion of the waste bag to at least temporarily attach the waste bag to the substrate. At least a second portion of the adhesive layer is in contact with at least a portion of the cover sheet to detachably attach the cover sheet to the substrate to maintain the waste bag in the folded configuration. With the cover sheet at least partly detached from substrate, the waste bag may be reconfigured from the folded configuration to the unfolded configuration.

BRIEF DESCRIPTION OF THE DRAWINGS

FIGS. 2-12 illustrate a first example process of reconfiguring the first example waste bag from the first example unfolded configuration to a first example folded configuration;

FIGS. 18-29 illustrate a second example process of reconfiguring the second example waste bag from the second example unfolded configuration to a second example folded configuration;

DETAILED DESCRIPTION

Figure 1:
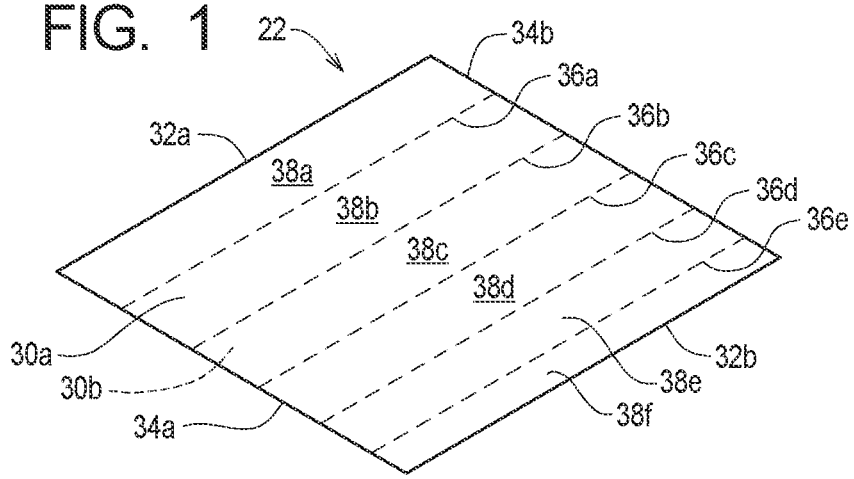
FIG. 1 depicts a first example waste bag in a first example unfolded configuration.

The present invention may be embodied in a number of forms, and two example pet waste bags of the present invention will be described separately herein. In the following discussion, elements identified by reference numerals with letter suffixes are associated with a portion or instance of an element identified by the same reference character without a letter suffix. Any reference numeral, whether used with letter suffixes or without letter suffixes, thus refers to only one element of the invention.

I. First Example Pet Waste Bag System

Figure 15:
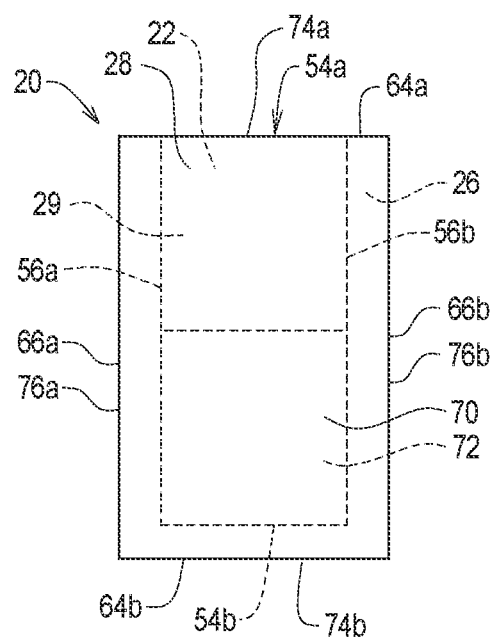
Figure 16:
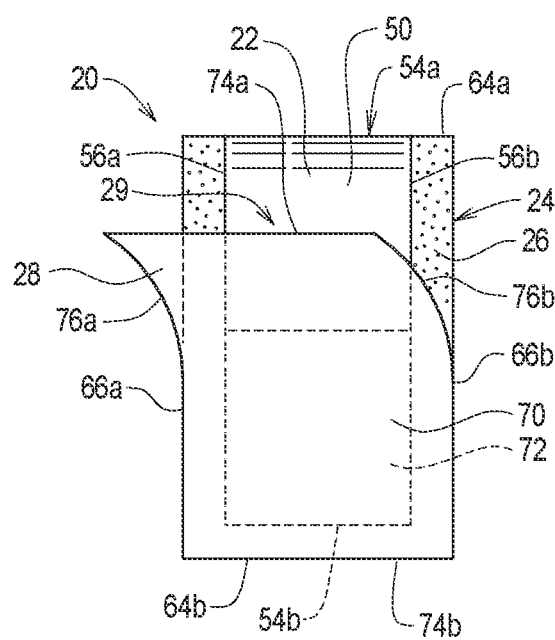
FIGS. 16-17 illustrate an example process of using the first example waste bag system.

FIGS. 15 and 16 illustrate a first example pet waste bag system 20 comprising a first example pet waste bag 22, a substrate 24 on which an adhesive layer 26 is formed, and a cover sheet 28. The first example pet waste bag 22 is detachably attached to the substrate 24 by the adhesive layer 26 such that at least a portion of the adhesive layer 26 remains exposed. The cover sheet 28 is then detachably attached to the substrate 24 by the exposed portion of the adhesive layer 26 to form a storage chamber 29 in which the first example first example pet waste bag 22 is stored during shipping and storage. During shipping and storage, the first example first example pet waste bag 22 is arranged in a folded configuration (FIGS. 11 and 12) and arranged within the storage chamber 29 (FIG. 15) such that the substrate 24 and cover sheet 28 cover at least a portion of the first example pet waste bag 22 arranged within the storage chamber 29. Prior to use, the cover sheet 28 is detached from the substrate 24 to expose the first example first example pet waste bag 22. With the first example first example pet waste bag 22 exposed, the first example first example pet waste bag 22 may be reconfigured from the folded configuration to an unfolded configuration (FIG. 1) for use in a conventional manner.

The details of construction and use of the first example pet waste bag system 20 will now be described in further detail.

In the unfolded configuration shown in FIG. 1, the example first example pet waste bag 22 takes the form of a substantially flat sheet and defines a plurality of faces 30, a plurality of end edges 32, and a plurality of side edges 34. Associated with the first example first example pet waste bag 22 in the unfolded configuration is a plurality of width reference lines 36 extending between the side edges 34 and a plurality of reference areas 38 defining areas of the faces 30. As best understood with reference to FIGS. 6 and 8, when in an intermediate configuration the first example first example pet waste bag 22 further defines a plurality of length reference lines 39.

The first example pet waste bag 22 may be made of any conventional, lightweight, material. For example, the pet waste bag may be made of plastic. The example first example pet waste bag 22 defines a first face 30a, a second face 30b, first and second end edges 32a and 32b, and first and second side edges 34a and 34b. The example pet waste bag further comprises first, second, third, fourth, and fifth width reference lines 36a, 36b, 36c, 36d, and 36e (FIG. 1), first, second, third, fourth, fifth, and sixth reference areas 38a, 38b, 38c, 38d, 38e, and 38f (FIG. 1), and first, second, third, and fourth length reference lines 39a, 39b, 39c, and 39d (FIGS. 6 and 8). As is conventional, the example first example pet waste bag 22 may comprise at least two layers (not visible in FIG. 1) sealed along the second end edge 32b and the first and second side edges 34a and 34b and not along the first end edge 32a such that the first end edge 32a defines the bag opening (not visible in FIG. 1). The sealed edges 32b, 34a, and 34b of the example first example pet waste bag 22 may be sealed using any conventional methods. The construction and use of the example first example pet waste bag 22 is or may be conventional and will not be described herein beyond that extent helpful to a complete understanding of the present invention.

Three of four of the end edges 32a and 32b and side edges 34a or 34b are sealed, and one of the end edges 32a or 32b or side edges 34a or 34b is unsealed such that example the first example pet waste bag 22 conventionally defines an opening (not visible) through which pet waste can pass and a bag chamber (not visible) for storing the pet waste for transportation and eventual disposal in a conventional manner. In the example first example pet waste bag 22, the first end edge 32a is unsealed and the second end edge 32b, the first side edge 34a, and the second side edge 34b are sealed.

FIGS. 2-7 illustrate the method of configuring the first example pet waste bag 22 from the unfolded configuration (FIGS. 1 and 18), into an intermediate configuration (FIGS. 6 and 7). FIGS. 8-12 illustrate an example method of configuring the first example pet waste bag 22 from the intermediate configuration into the folded configuration (FIGS. 11 and 12).

Figure 2:
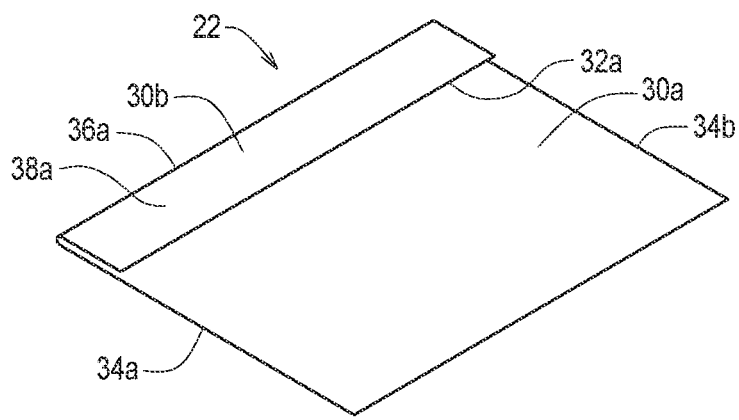
Figure 3:
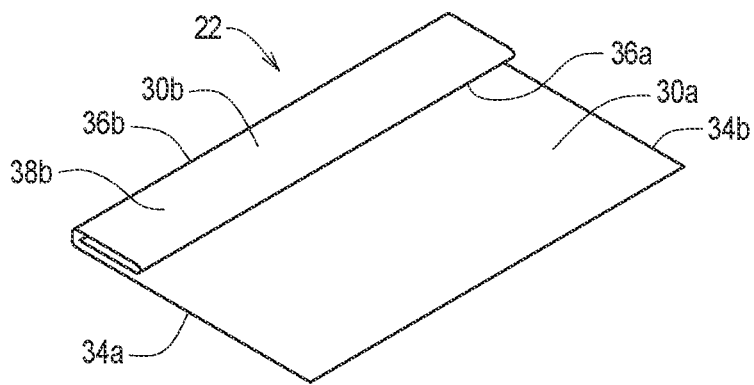

Referring initially to FIG. 2, the first side edge 32a of the first example pet waste bag 22 may be folded onto the first face 30a along the first width fold line 36a to create a first width fold. The first side edge 32a may then be folded back toward the second face 30b along the second width fold line 36b to create a second width fold. As shown in FIGS. 3-6, the user may continue folding the first side edge 32a forward toward the front face 30 and back toward the second face 30b of the first example pet waste bag 22 sequentially along the third, fourth, and fifth width lines 36c, 36d, and 36e in a fanfold or accordion fashion to obtain an intermediate configuration (FIGS. 6 and 7).

The method of folding the first example pet waste bag 22 as described in connection with FIGS. 2-7 creates a plurality of generally planar width folds in the first example pet waste bag 22, which results in a more compact configuration of the first example pet waste bag 22. When the first example is in the intermediate configuration as shown in FIGS. 2-7, first, second, third, fourth, and fifth width folds 40a, 40b, 40c, 40d, and 40e are formed.

The exact dimensions of each of the plurality of width folds 40 may vary in order to achieve a desired compact and stable configuration of the first example pet waste bag 22 when in the intermediate configuration and, subsequently, the folded configuration. In some embodiments, the plurality of width folds 40 may be substantially the same width and thickness. In other embodiments, the plurality of width folds 40 may be of different widths and thickness as shown in FIGS. 6 and 7. In particular, the first width fold 40a defines first dimension D1, the second width fold 40b defines a second dimension D2, the third width fold 40c defines a third dimension D3, the fourth width fold 40d defines a fourth dimension D4, and the fifth width fold 40e defines a fifth dimension D5. With the first example pet waste bag 22 in the intermediate and folded configurations, the first dimension D1 is approximately the same as the second dimension D2, the second dimension D2 is greater than the third dimension D3, the third dimension D3 is greater than the fourth dimension D4, the fourth dimension D4 is greater than the fifth dimension D5, and the fifth dimension D6 is greater than the sixth dimension D6.

Figure 10:
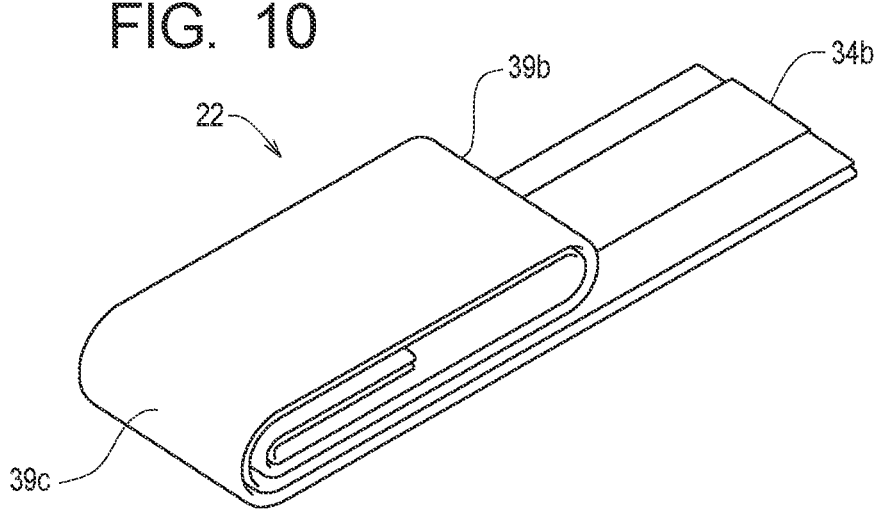
Figure 11:
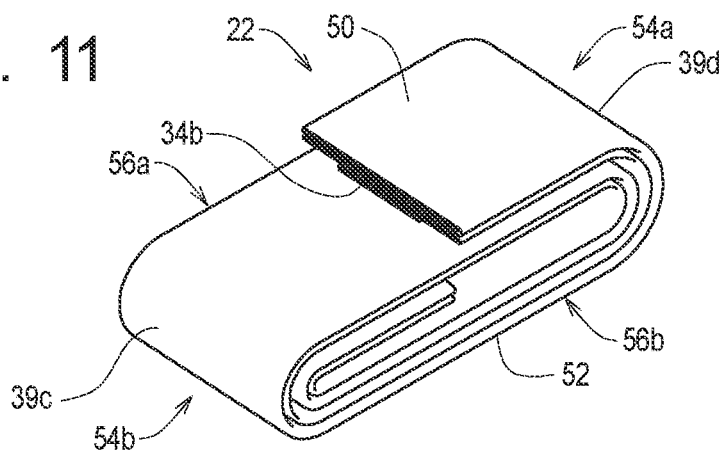
Figure 12:
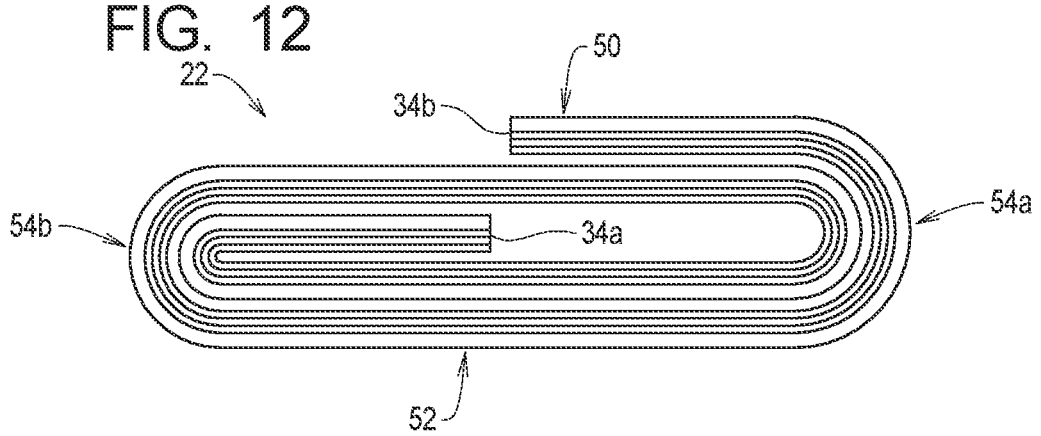

Referring now to FIGS. 8-12, the first example pet waste bag 22 is next arranged from the intermediate configuration into the folded configuration by folding the compact first example pet waste bag 22 lengthwise along the length folds 39a, 39b, 39c, and 39d (e.g., substantially perpendicular to the plurality of width fold lines 36). In particular, FIG. 8 illustrates that the second edge 32b of the first example pet waste bag 22 is folded, lengthwise, along the first length line 34a toward the second edge 34b. The result is a first length fold. The first example pet waste bag 22 is further folded as shown in FIGS. 9 and 10 along the second and third length lines 39b and 39c to create second and third length folds. To complete arrangement of the first example first example pet waste bag 22 into the folded configuration, the first edge 34b of the first example pet waste bag 22 is folded inward along the fourth length line 39d such that the first example pet waste bag 22 in the folded configuration as shown in FIGS. 11 and 12. In the folded configuration, the waste bag defines a folded bag form factor, which is smaller than both the unfolded form factor and the intermediate form factor.

FIGS. 11 and 12 illustrate that, in the folded configuration, the first example pet waste bag 22 defines a first face 50, a second face 52, a first and second end edges 54a and 54b, and first and second side edges 56a and 56b. FIGS. 11 and 12 are somewhat schematic to show the various folds and thus the distance between the first and second faces 50 and 52 is exaggerated. In practice, the material from which the first example pet waste bag 22 is, as is conventional, very thin, and ratio of the distance between the first and second faces 50 and 52 and the distance between the first and second end edges 52a and 52b is typically within a first range of approximately 1:20 to 1:100 and is, in any event, within a second rage of less than 1:10. FIG. 12 further illustrates that, in at least one dimension, the first and last length folds are approximately the same length, the intermediate length folds between the first and last length folds are approximately the same length, and the first and last length folds are shorter than the intermediate length folds.

Figure 13:
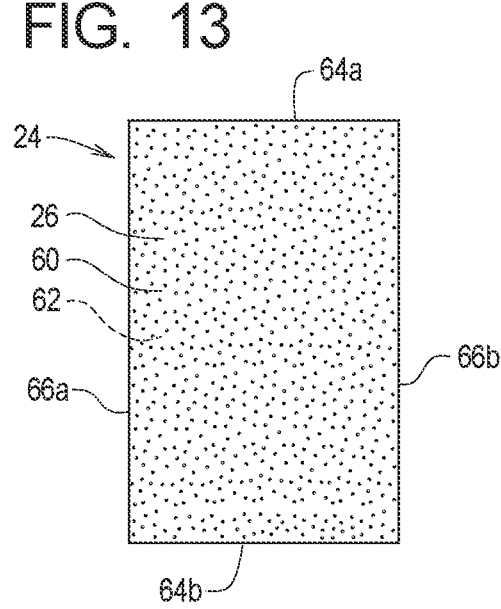
FIGS. 13-15 illustrate a first example process of forming a first example waste bag system of the present invention.

FIG. 13 illustrates that the example substrate 24 defines a first face 60, a second face 62 opposite the first face 60, first and second end edges 64a and 64b, and first and second side edges 66a and 66b. The substrate 24 may be flexible or rigid. The substrate may be mono-layered or multilayered. The example adhesive layer 26 is formed on the example substrate 24 to facilitate detachable attachment of the pet waste bag 22 to the substrate 24 and of the cover sheet 28 to the substrate 24 to form the chamber 29. The example adhesive layer 26 is applied to or integrally formed on the first face 60 of the example substrate 24 such that the first face 60 is adhesive. The substrate 24 has a thickness effective for the desired application. The substrate 24 and the adhesive layer 26 may be formed by any or a variety of processes known in the art. The example substrate 24 may take the size, shape, composition, and flexibility of a business, credit, debit, or gift card to facilitate storage in a wallet or the like.

FIGS. 15 and 16 illustrate that the example cover sheet 28 defines a first face 70, a second face 72, first and second end edges 74a and 74b, and first and second side edges 76a and 76b. The cover sheet 28 may be made of any conventional material, flexible or rigid, effective for the desired application. The cover sheet 28 may be any flexible material such as paper, plastic, or the like and may be a monolayer structure or a multilayer structure. Additionally, the example cover sheet 28 has a thickness effective for the desired application. The example cover sheet 28 is a peelable flexible plastic film or paper sheet and may be of a similar or the same size, shape, and/or composition as the example substrate 24 but is typically less rigid to facilitate peeling.

Figure 14:
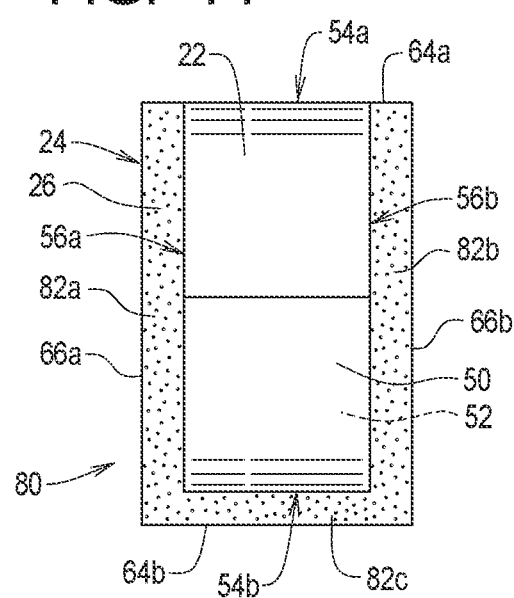

To form the first example pet waste bag system 20, the first example pet waste bag 22, in its folded configuration, is secured between the example substrate 24 and the example cover sheet 28. In particular, the first example pet waste bag 22 in the folded configuration is arranged such that the second face 52 thereof is in contact with the adhesive layer 26 as shown in FIG. 14 to define a first pet bag substructure 80. As shown in FIG. 14, the first pet bag substructure 80 defines at least one adhesive margin portion 82 when the example pet waste bag 22 attached to the substrate 24. In particular, the folded first example pet waste bag 22 is arranged such that the first end edge 54a thereof is aligned with the first end edge 64a of the substrate 24 to define first, second, and third margin portions 82a, 82b, and 82c. The cover sheet 28 is next arranged such that at least a portion of the second face 72 of the cover sheet 28 is in contact with at least one of the first, second, and third margin portions 82a, 82b, and 82c. More specifically, in the example pet waste bag system 20, the first and second end edges 74a and 74b and the first and second side edges 76a and 76b of the cover sheet 28 are substantially aligned with the first and second end edges 64a and 64b, and first and second side edges 66a and 66b of the substrate 24, respectively.

Figure 17:
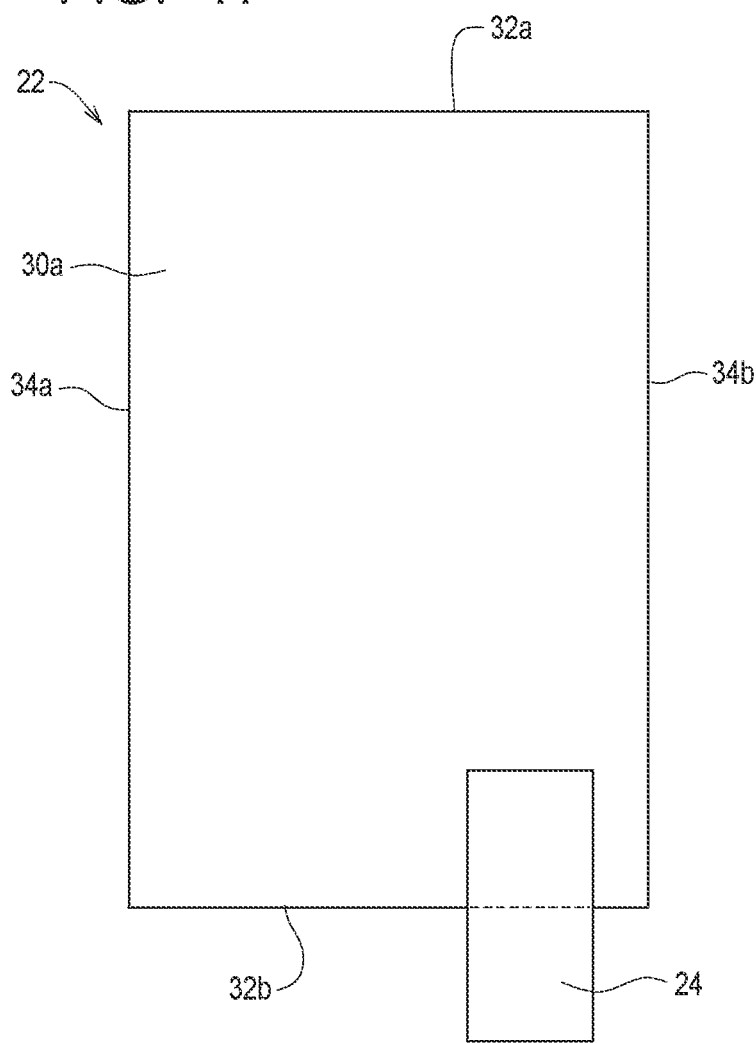

To use the example pet waste bag 22, the cover sheet 28 is peeled off the substrate 24 starting from the line defined by the first end edge 64a of the substrate 24 and the first end edge 74a of the cover sheet 28 as shown in FIG. 16. Once the cover sheet 28 is substantially or completely removed from the substrate 24, the first example pet waste bag 22 is unfolded into the unfolded configuration such that the cover sheet 28 and the substrate 24 are at the opposite end as the opening in the first end edge 32a as shown in FIG. 17. The first example pet waste bag 22 may be used in the configuration shown in FIG. 7 with or without removing the substrate 24 from the first example pet waste bag 22.

II. Second Example Pet Waste Bag System

FIGS. 18-31 illustrate the assembly and use of a second example pet waste bag system 120 of the present invention. The second example pet waste bag system 120 comprising a second example pet waste bag 122, a substrate 124 on which an adhesive layer 126 is formed, and a cover sheet 128. The second example pet waste bag 122 is detachably attached to the substrate 124 by the adhesive layer 126 such that at least a portion of the adhesive layer 126 remains exposed. The cover sheet 128 is then detachably attached to the substrate 124 by the exposed portion of the adhesive layer 126 to form a storage chamber 129 in which the second example second example pet waste bag 122 is stored during shipping and storage. During shipping and storage, the second example second example pet waste bag 122 is arranged in a folded configuration (FIGS. 28 and 29) and arranged within the storage chamber 129 such that the substrate 124 and cover sheet 128 cover at least a portion of the second example pet waste bag 122 arranged within the storage chamber 129. Prior to use, the cover sheet 128 is detached from the substrate 124 to expose the second example second example pet waste bag 122. With the second example second example pet waste bag 122 exposed, the second example second example pet waste bag 122 may be reconfigured from the folded configuration to an unfolded configuration (FIG. 18) for use in a conventional manner.

The details of construction and use of the second example pet waste bag system 120 will now be described in further detail.

Figure 18:
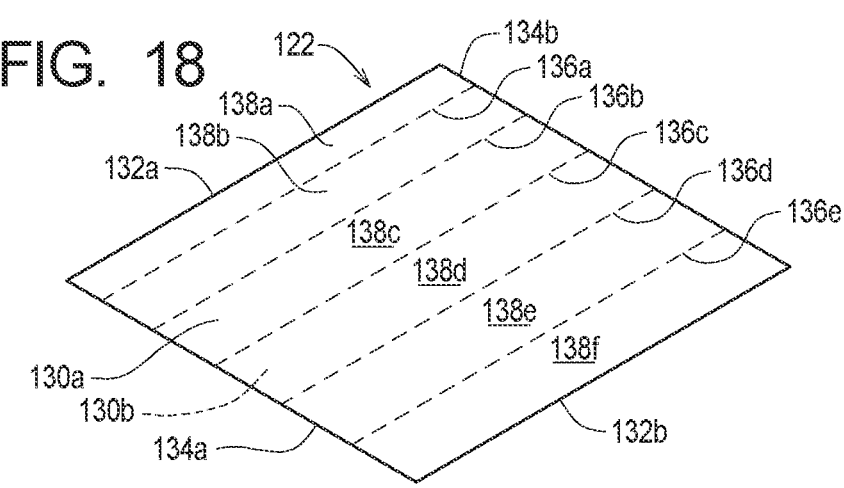
FIG. 18 depicts a second example waste bag in a second example unfolded configuration.

FIG. 18 illustrates that the unfolded configuration in which the example second example pet waste bag 122 takes the form of a substantially flat sheet and defines a plurality of faces 130, a plurality of end edges 132, and a plurality of side edges 134. Associated with the second example second example pet waste bag 122 in the unfolded configuration is a plurality of width reference lines 136 extending between the side edges 134 and a plurality of reference areas 138 defining areas of the faces 130. As best understood with reference to FIG. 23, when in an intermediate configuration the second example second example pet waste bag 122 further defines a plurality of length reference lines 139.

The second example pet waste bag 122 may be made of any conventional, lightweight, material. For example, the pet waste bag may be made of plastic. The example second example pet waste bag 122 defines a first face 130a, a second face 130b, first and second end edges 132a and 132b, and first and second side edges 134a and 134b. The example pet waste bag further comprises first, second, third, fourth, and fifth width reference lines 136a, 136b, 136c, 136d, and 136e (FIG. 18), first, second, third, fourth, fifth, and sixth reference areas 138a, 138b, 138c, 138d, 138e, and 138f (FIG. 18), and first, second, third, and fourth length reference lines 139a, 139b, 139c, and 139fd (FIG. 23). As is conventional, the example second example pet waste bag 122 may comprise at least two layers (not visible in FIG. 18) sealed along the second end edge 132b and the first and second side edges 134a and 134b and not along the first end edge 132a such that the first end edge 132a defines the bag opening (not visible in FIG. 18). The sealed edges 132b, 134a, and 134b of the example second example pet waste bag 122 may be sealed using any conventional methods. The construction and use of the example second example pet waste bag 122 is or may be conventional and will not be described herein beyond that extent helpful to a complete understanding of the present invention.

Three of four of the end edges 132a and 132b and side edges 134a or 134b are sealed, and one of the end edges 132a or 132b or side edges 134a or 134b is unsealed such that example the second example pet waste bag 122 conventionally defines an opening (not visible) through which pet waste can pass and a bag chamber (not visible) for storing the pet waste for transportation and eventual disposal in a conventional manner. In the example second example pet waste bag 122, the first end edge 132a is unsealed and the second end edge 132b, the first side edge 134a, and the second side edge 134b are sealed.

FIGS. 19-23 illustrate the method of configuring the second example pet waste bag 122 from the unfolded configuration (FIGS. 18 and 30), into an intermediate configuration (FIGS. 23 and 24). FIGS. 25-28 illustrate an example method of configuring the second example pet waste bag 122 from the intermediate configuration into the folded configuration (FIGS. 28 and 29).

Figure 19:
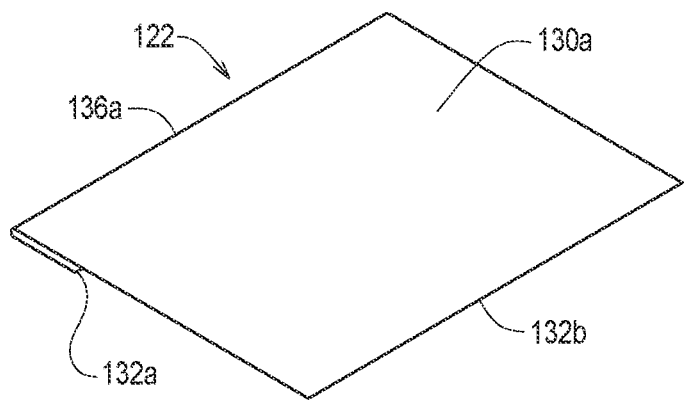
Figure 20:
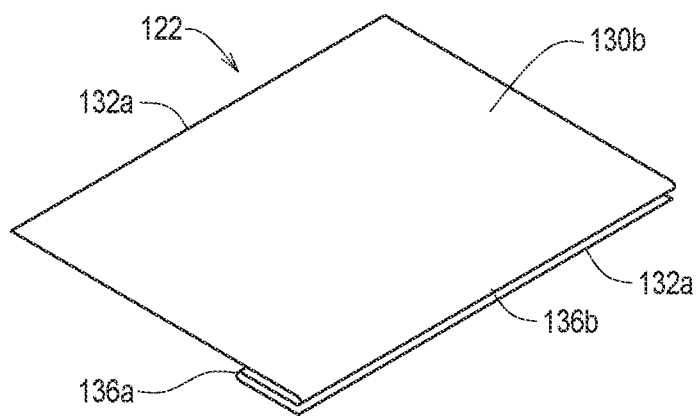

Referring initially to FIG. 19, the first side edge 132a of the second example pet waste bag 122 may be folded onto the second face 130b along the first width fold line 136a to create a first width fold. The first side edge 132a may then be folded back toward the second face 130b along the second width fold line 136b to create a second width fold as shown in FIG. 20. As shown in FIG. 21-23, the user may continue folding the first side edge 132a forward toward the front face 130a and back toward the second face 130b of the second example pet waste bag 122 sequentially along the third, fourth, and fifth width lines 136c, 136d, and 136e in a fanfold or accordion fashion to obtain an intermediate configuration (FIGS. 23 and 24).

The method of folding the second example pet waste bag 122 creates a plurality of generally planar width folds 140 in the second example pet waste bag 122, which results in a more compact configuration of the second example pet waste bag 122. When the second example is in the intermediate configuration as shown in FIGS. 23 and 24, first, second, third, fourth, and fifth, width folds 140a, 140b, 140c, 140d, and 140e are formed.

The exact dimensions of each of the plurality of width folds 140 may vary in order to achieve a desired compact and stable configuration of the second example pet waste bag 122 when in the intermediate configuration and, subsequently, the folded configuration. In some embodiments, the plurality of width folds 140 may be substantially the same width and thickness. In other embodiments, the plurality of width folds 140 may be of different widths and thickness as shown in FIGS. 23 and 24. In particular, the first width fold 140a defines first dimension D1, the second width fold 140b defines a second dimension D2, the third width fold 140c defines a third dimension D3, the fourth width fold 140d defines a fourth dimension D4, and the fifth width fold 140e defines a fifth dimension D5. With the second example pet waste bag 122 in the intermediate and folded configurations, the first dimension D1 is greater than the second dimension D2, the second dimension D2 is greater than the third dimension D3, the third dimension D3 is greater than the fourth dimension D4, and the fourth dimension D4 is greater than the fifth dimension D5.

Figure 25:
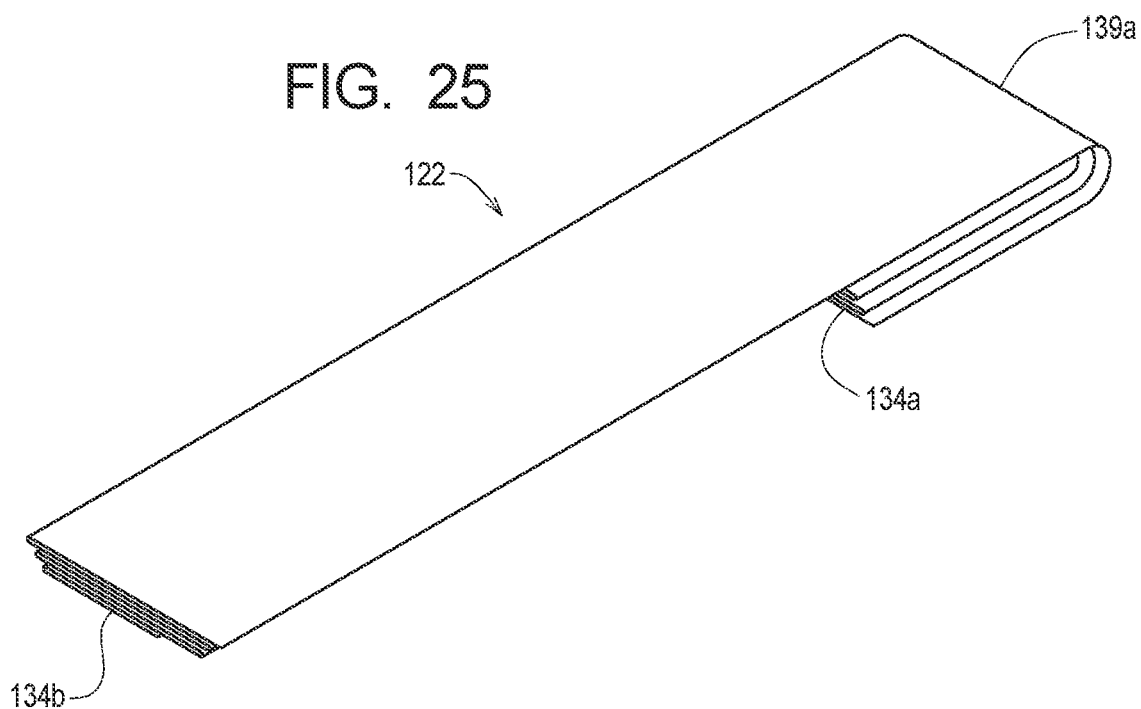
Figure 26:
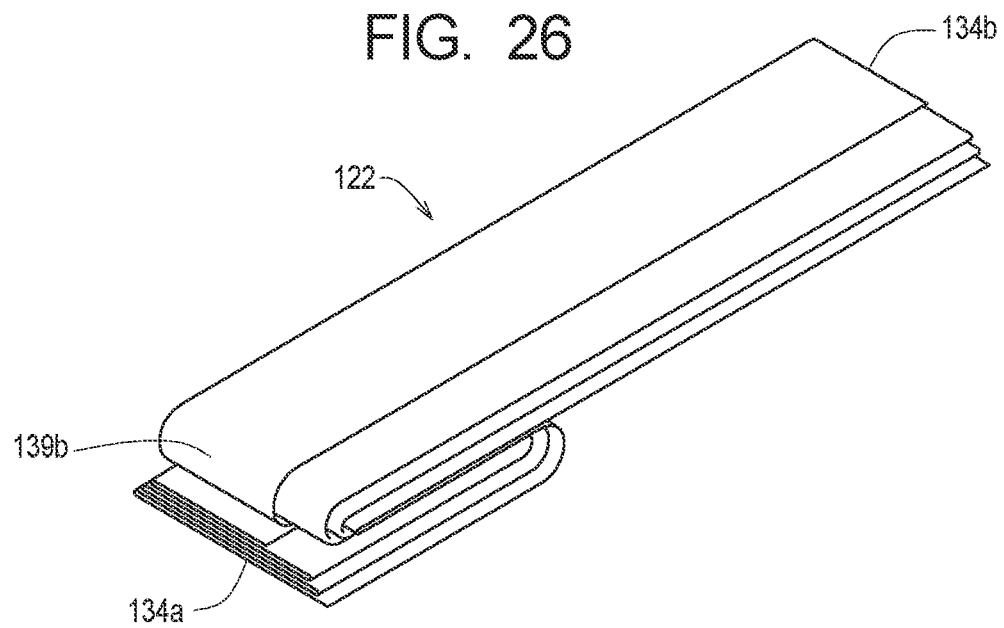
Figure 27:
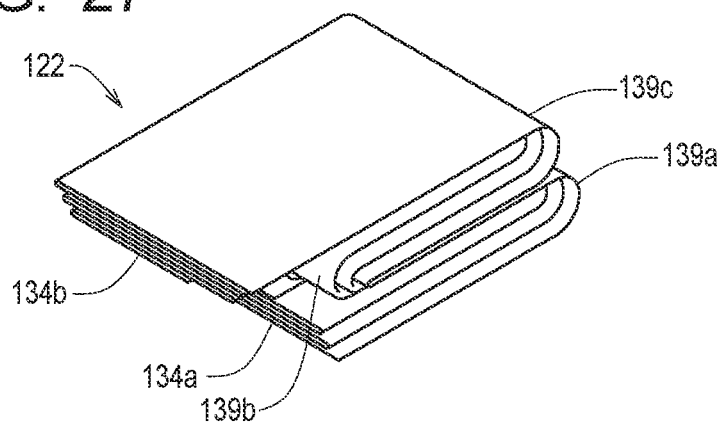
Figure 28:
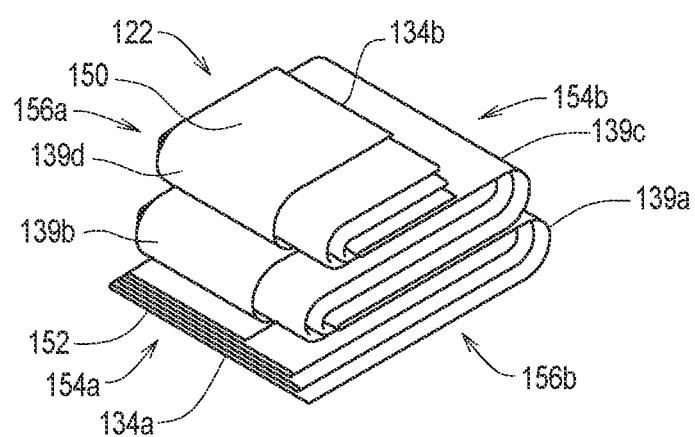
Figure 29:
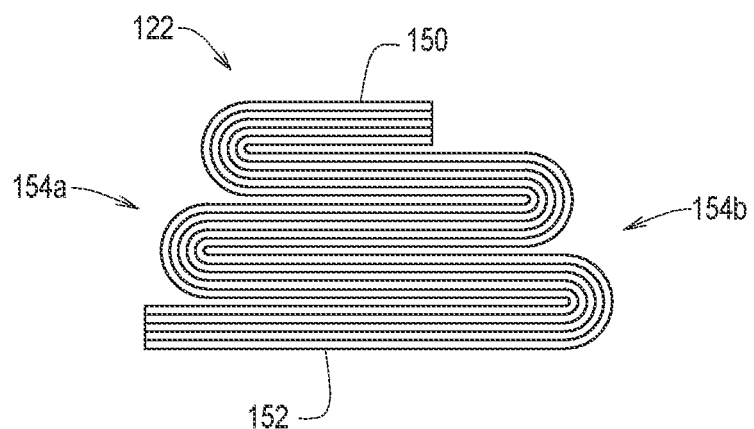

Referring now to FIGS. 25-29, the second example pet waste bag 122 is next arranged from the intermediate configuration into the folded configuration by folding the compact second example pet waste bag 122 lengthwise along the length folds 139a, 139b, 139c, and 139d (e.g., perpendicular to the plurality of width fold lines 136) in a serpentine fashion. In particular, FIG. 25 illustrates that the second edge 132b of the second example pet waste bag 122 is folded, lengthwise, along the first length line 134a toward the second side 134b. The result is a first length fold. The second example pet waste bag 122 is further folded as shown in FIG. 26 along the second and third length lines 139b and 139c to create second and third length folds. To complete arrangement of the second example pet waste bag 122 into the folded configuration, the first side 134a of the second example pet waste bag 122 is folded inward along the fourth length line 139d such that the second example pet waste bag 122 in the folded configuration as shown in FIGS. 27 and 28. In the folded configuration, the waste bag defines a folded bag form factor, which is smaller than both the unfolded form factor and the intermediate form factor. FIGS. 28 and 29 illustrate that each successive the length fold is slightly smaller in at least one dimension than the previous length fold.

FIGS. 28 and 29 illustrate that, in the folded configuration, the second example pet waste bag 122 defines a first face 150, a second surface 152, a first and second end edges 156a and 156b, and first and second side edges 154a and 154b. FIGS. 28 and 29 are somewhat schematic to show the various folds and thus the distance between the first and second faces 150 and 152 is exaggerated. In practice, the material from which the first example pet waste bag 122 is, as is conventional, very thin, and ratio of the distance between the first and second faces 150 and 152 and the distance between the first and second end edges 156a and 156b is typically within a first range of approximately 1:20 to 1:100 and is, in any event, within a second rage of less than 1:10.

Figure 30:
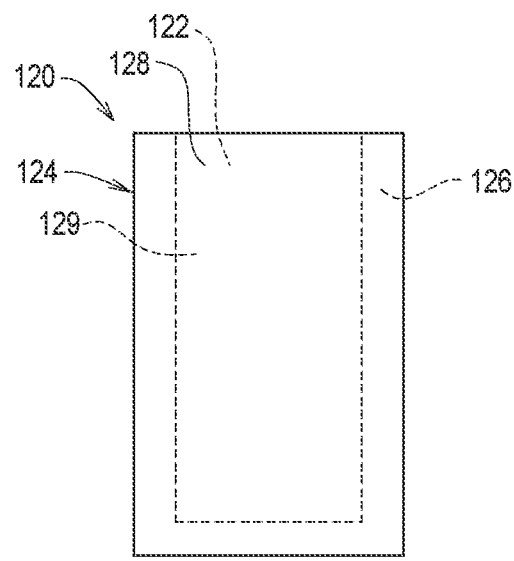
FIG. 30 illustrates an example process of forming an example waste bag system of the present invention using the second example waste bag.

Referring now to FIG. 30, the example substrate 124, adhesive layer 126, and cover sheet 128 may be sized, dimensioned, and/or shaped in substantially the same manner as the example substrate 24, adhesive layer 26, and cover sheet 28 described above. Further, the example substrate 124, the adhesive layer 126, and the cover sheet 128 are or may be assembled together with the second example pet waste bag 122 to form the second example pet waste bag system 120 in substantially the same manner as the example substrate 24, the example adhesive layer 26, and the example cover sheet 28 are assembled together with the first example pet waste bag 22 to form the first example pet waste bag 20. Accordingly, the example substrate 124, the example adhesive layer 126, and the example cover sheet 128, and the example method of forming the second example pet waste bag system 120, will not be described herein again in detail.

Figure 31:
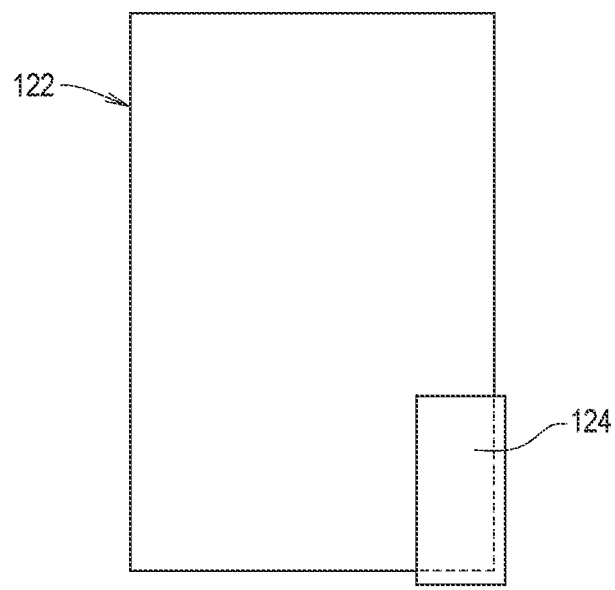
FIG. 31 illustrates a relationship of the substrate to the second example waste bag immediately prior to use.

To use the example pet waste bag 122, the cover sheet 128 is peeled off the substrate 124. Once the cover sheet 128 is substantially or completely removed from the substrate 124, the second example pet waste bag 122 is unfolded into the unfolded configuration such that the cover sheet 128 and the substrate 124 are at the opposite end as the opening in the first end edge 132a as shown in FIG. 31. The second example pet waste bag 122 may be used in the configuration shown in FIG. 30 with or without removing the substrate 124 from the second example pet waste bag 122.

What is claimed is:
1. A waste bag system comprising:
 a substrate defining an adhesive surface and a substrate perimeter edge, where the adhesive surface defines at least a first adhesive surface portion and a second adhesive surface portion extending along at least a portion of the substrate perimeter edge;
 a waste bag configured to be arranged in
  a folded configuration, and
  an unfolded configuration; and a cover sheet defining a cover sheet perimeter edge surface portion; wherein with the waste bag in the folded configuration, at least a portion of the waste bag is in contact with at least the first adhesive surface portion to at least temporarily attach the waste bag to the substrate in a folded and stored configuration, and with the waste bag in the folded and stored configuration, at least a portion of the cover sheet perimeter edge surface portion comes into contact with the second portion of the adhesive surface to detachably attach the cover sheet to the substrate to cover at least a portion of the waste bag; and with the cover sheet at least partly detached from substrate, the waste bag may be reconfigured from the folded and stored configuration to the unfolded configuration.

2. The waste bag system of claim 1, wherein:
the folded configuration defines a folded bag form factor;
the unfolded configuration defines an unfolded bag form factor; and
the unfolded bag form factor is larger than the folded bag form factor.

3. The waste bag system of claim 1, wherein, when the waste bag is in the folded configuration, the waste bag defines a plurality of width folds.

4. The waste bag system of claim 1, wherein, when the waste bag is in the folded configuration, the waste bag defines a plurality of length folds.

5. The waste bag system of claim 1, in which:
in the folded configuration, the waste bag defines a plurality of width folds and a plurality of length folds; and
each of the plurality of length folds is generally perpendicular to each of the plurality of width folds.

6. The waste bag system of claim 1, wherein the composition of the cover sheet allows the cover sheet to be peeled away from the substrate.

7. The waste bag as recited in claim 1, in which:
when the waste bag in the folded configuration is detachably attached to the first adhesive surface portion, at least the second adhesive surface portion is exposed; and
the cover sheet is detachably attached to the exposed second adhesive surface portion of the adhesive surface.

8. The waste bag of claim 1, further comprising an adhesive layer is formed on the adhesive surface of the substrate.

9. A waste bag system comprising:
a substrate defining a main surface having a substrate perimeter edge, where the main surface defines at least a first main surface portion and a second main surface portion extending along at least a portion of the substrate perimeter edge;
an adhesive layer formed on the main surface;
a waste bag configured to be arranged in
a folded configuration defining a folded bag form factor, and
an unfolded configuration defining an unfolded bag form factor, where the unfolded bag form factor is larger than the folded bag form factor; and
a cover sheet defining a cover sheet perimeter edge surface portion; wherein with the waste bag in the folded configuration, the adhesive layer on the first main surface portion is in contact with at least a portion of the waste bag to at least temporarily attach the waste bag to the substrate in a folded and stored configuration;

with the waste bag in the folded and stored configuration, the adhesive layer on the second main surface portion is in contact with the cover sheet perimeter edge surface portion to detachably attach the cover sheet to the substrate to cover at least a portion of the waste bag; and with the cover sheet at least partly detached from substrate, the waste bag may be reconfigured from the folded and stored configuration to the unfolded configuration.

10. The waste bag system of claim 9, in which:
in the folded configuration, the waste bag comprises a plurality of width folds and a plurality of length folds; and
each of the plurality of length folds is generally perpendicular to each of the plurality of width folds.

11. The waste bag system of claim 9, wherein the composition of the cover sheet and of the adhesive layer allows the cover sheet to be peeled away from the substrate.

12. A method of storing and transporting a waste bag comprising the steps of:
providing a substrate defining an adhesive surface and a substrate perimeter edge, where the adhesive surface defines at least a first adhesive surface portion and a second adhesive surface portion extending along at least a portion of the substrate perimeter edge;
providing a waste bag;
providing a cover sheet defining a cover sheet perimeter edge surface portion;
arranging the waste bag in a folded configuration;
with the waste bag in the folded configuration, arranging the waste bag such at least a portion of the waste bag comes into contact with at least the first portion of the adhesive surface of the substrate to detachably attach the waste bag to the substrate in a folded and stored configuration;
with the waste bag in the folded and stored configuration, arranging the cover sheet such at least the cover sheet perimeter edge surface portion comes into contact with at least the second portion of the adhesive surface of the substrate to detachably attach the cover sheet to the substrate; and
at least partly detaching the cover sheet from the substrate to expose the waste bag to allow reconfiguration of the waste bag from the folded and stored configuration to the unfolded configuration.

13. The method of claim 12, in which the step of arranging the waste bag in the folded configuration comprises the steps of:
forming a plurality of width folds;
forming a plurality of length folds, where each of the plurality of length folds is generally perpendicular to each of the plurality of width folds.

14. The method of claim 12, in which the step of providing the substrate further comprises the step of applying an adhesive layer on the substrate to define the adhesive surface of the substrate.

* * * * *